(12) United States Patent
Masuda et al.

(10) Patent No.: US 6,297,814 B1
(45) Date of Patent: Oct. 2, 2001

(54) APPARATUS FOR AND METHOD OF DISPLAYING IMAGE AND COMPUTER-READABLE RECORDING MEDIUM

(75) Inventors: Hidetomo Masuda; Yuji Tamura, both of Kobe (JP)

(73) Assignee: Konami Co., Ltd., Hyogo-ken (JP)

(*) Notice: Subject to any disclaimer, the term of this patent is extended or adjusted under 35 U.S.C. 154(b) by 0 days.

(21) Appl. No.: 09/149,667

(22) Filed: Sep. 9, 1998

(30) Foreign Application Priority Data

Sep. 17, 1997 (JP) .................................................. 9-251667

(51) Int. Cl.[7] .................................................. G09G 5/36
(52) U.S. Cl. ........................... 345/204; 345/139; 345/419
(58) Field of Search .................................. 345/139, 204, 345/419

(56) References Cited

U.S. PATENT DOCUMENTS

| | | | |
|---|---|---|---|
| 4,656,506 | * 4/1987 | Ritchey | 348/39 |
| 4,772,942 | * 9/1988 | Tuck | 348/39 |
| 5,502,481 | 3/1996 | Dentinger et al. | . |
| 5,695,406 | * 12/1997 | Park | 472/61 |
| 5,848,829 | * 12/1998 | Terada et al. | 353/74 |
| 5,864,431 | * 1/1999 | Bordovsky | 359/630 |

FOREIGN PATENT DOCUMENTS 8-271979    10/1996 (JP) .
WO8703980    7/1987 (WO) .

OTHER PUBLICATIONS

Online technical information on the Flostatin at www.vetl.u-h.edu/~erik/Bubble, 1996, particularly the document bubbArch.html.*

Flogiston Corp. web site: www.flogiston.com.*

Patent Abstracts of Japan, vol. 097, No. 002, Feb. 28, 1997 & JP 08 271979 A (Hitachi Ltd), Oct. 18, 1996.

* cited by examiner

*Primary Examiner*—Steven Saras
*Assistant Examiner*—William C. Spencer
(74) *Attorney, Agent, or Firm*—Jordan and Hamburg LLP

(57) ABSTRACT

A control system of a game apparatus, such as a racing game apparatus, has a CPU for controlling a signal processor based on a program stored in a computer-readable recording medium to process three-dimensional image data for perspective projection and horizontal image distortion correction for images to be projected onto a curved projection screen. The CPU also controls an image display processor to write the processed image data into a RAM, from which the image data is supplied to an image projector to project the images onto the curved projection screen. The curved projection screen gives a game player, e.g., a racing car driver, a horizontally long panoramic view in front of the game player so that the images displayed on the curved projection screen look wide and realistic.

21 Claims, 11 Drawing Sheets

APPARATUS FOR AND METHOD OF DISPLAYING IMAGE AND COMPUTER-READABLE RECORDING MEDIUM

BACKGROUND OF THE INVENTION

The present invention relates to an image display apparatus for use in a game apparatus, such as a racing game apparatus or a shooting game apparatus, or a driving simulation apparatus which will be operated by the player or user while seeing a front three-dimensional graphic image from a driver's seat on a car, a spacecraft, or the like, a method of displaying an image with such an image display apparatus, and a computer-readable recording medium which stores a control program for performing such a method.

Image display apparatus combined with racing game apparatus, for example, display an image on a display screen as viewed in front of a driver's seat by a car driver seated on the driver's seat behind a steering wheel. The game player operates the racing game apparatus to play the racing game while seeing the displayed image on the display screen. As the racing game played on the racing game apparatus proceeds, the displayed image changes depending on how the game player operates the racing game apparatus. For example, when the game player turns the steering wheel clockwise, the display screen displays the image of a right-hand area in front of the car to make the car look as if steered to the right. Conversely, when the game player turns the steering wheel counterclockwise, the display screen displays the image of a left-hand area in front of the car to make the car look as if steered to the left. When the game player presses the accelerator pedal, the display screen displays an image moving backwards at an increased speed to make the car look as if it is accelerated. When the game player presses the brake pedal, the display screen displays an image moving backwards at a reduced speed to make the car look as if it is decelerated.

One conventional image display apparatus for use with such a racing game apparatus is shown in FIG. 1 of the accompanying drawings. As shown in FIG. 1, an image 62 of a road and buildings and trees along the road, as viewed from a driver's seat and changed as the game player operates the racing game apparatus, is projected from an image display apparatus 61 onto a flat projection screen at an enlarged scale for the game player to see with ease.

Since the image 62 is projected onto the flat projection screen, the image light from the image display apparatus 61 is applied obliquely to end regions of the flat projection screen while it is applied substantially perpendicularly to a central region of the flat projection screen. Therefore, the image 62 projected onto the flat projection screen is more elongated in the opposite end regions than in the central region of the flat projection screen, and hence looks distorted to the game player. Specifically, when an image 62 of nine circular spots is projected onto the flat projection screen, as shown in FIG. 2 of the accompanying drawings, the central circular spot is displayed as a circular spot on the flat projection screen, but the other circular spots positioned around the central circular spot are displayed as being distorted into elliptical circular spots because the image light of these other circular spots is applied obliquely to the end regions of the flat projection screen. The image light emitted from the image display apparatus 61 through a projection lens thereof travels along a light path which is longer in the end regions than in the central region of the flat projection screen. Consequently, the image 62 projected onto the flat projection screen is more enlarged in the end regions than in the central region of the flat projection screen.

One way of obtaining a three-dimensional and realistic visual perception from images projected in front of the driver's seat is to employ a horizontally long flat projection screen for displaying panoramic images thereon. However, the horizontally long flat projection screen suffers a problem in that the displayed images are greatly elongated or expanded in horizontal end regions of the flat projection screen.

There is known a data conversion process for converting image data with a virtual spherical screen for three-dimensional spatial image rendering. If the known data conversion process is applied to the projected image 62 shown in FIG. 3A of the accompanying drawings, then the image data of the image 62 is converted to image data for displaying a projected image 63. However, if the known data conversion process is applied to a projected image 62*b* shown in FIG. 3B of the accompanying drawings, then the image data of the projected image 62*b* is converted to image data for displaying a projected image 63*b* on a flat screen. The projected image 63*b* looks unnatural because its shape is distorted as if viewed through a wide-angle lens. The above data conversion process needs a complex hardware arrangement for its execution because the hardware arrangement should perform a data conversion function for an increased data processing rate.

SUMMARY OF THE INVENTION

It is therefore an object of the present invention to provide an image display apparatus which is capable of projecting natural and realistic images onto a horizontally long projection screen without substantial image distortions such as image elongations or expansions at opposite end regions thereof.

Another object of the present invention is to provide a method of displaying an image with such an image display apparatus.

Still another object of the present invention is to provide a computer-readable recording medium which stores a control program for performing such a method.

According to an aspect of the present invention, an image display apparatus has a concave projection screen extending about an axis and image projecting means for projecting images onto a rear convex surface of the concave projection screen. The image display apparatus also has control means for horizontally correcting image data for images to be projected onto respective opposite screen areas of the concave projection screen which are disposed one on each side of the axis.

According to another aspect of the present invention, there is provided a method of projecting images onto a rear convex surface of a concave projection screen extending about an axis. The method comprises the step of horizontally correcting image data for images to be projected onto respective opposite screen areas of the concave projection screen which are disposed one on each side of the axis.

According to still another aspect of the present invention, there is provided a computer-readable recording medium storing a control program for projecting images onto a rear convex surface of a concave projection screen extending about an axis. The control program comprises the step of horizontally correcting image data for images to be projected onto respective opposite screen areas of the concave projection screen which are disposed one on each side of the axis.

The image data may be horizontally corrected by multiplying the image data by the reciprocal of a horizontal distortion ratio along the concave projection screen.

Each of the opposite screen areas may have a first width, and the horizontal distortion ratio may comprise a horizontal elongation ratio of the first width to a width of each of the opposite screen areas as viewed from the image projecting means.

The concave projection screen may have a central screen area disposed between the opposite screen areas, the opposite screen areas being inclined to the central screen area such that the opposite screen areas are progressively away from the image projecting means in directions away from the central screen area.

The concave projection screen may be divided into a plurality of flat screen areas including the opposite screen areas and the central screen area, and extend around a front side of an observer position. The image data is generated as if by respective hypothetical cameras having respective directions of view extending perpendicularly to the flat screen areas, respectively.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

An image display apparatus according to the present invention will be described below as being incorporated in a racing game apparatus which is played by a game player to drive a racing car to compete with other racing cars on road tracks displayed in a virtual three-dimensional game space.

Figure 1:
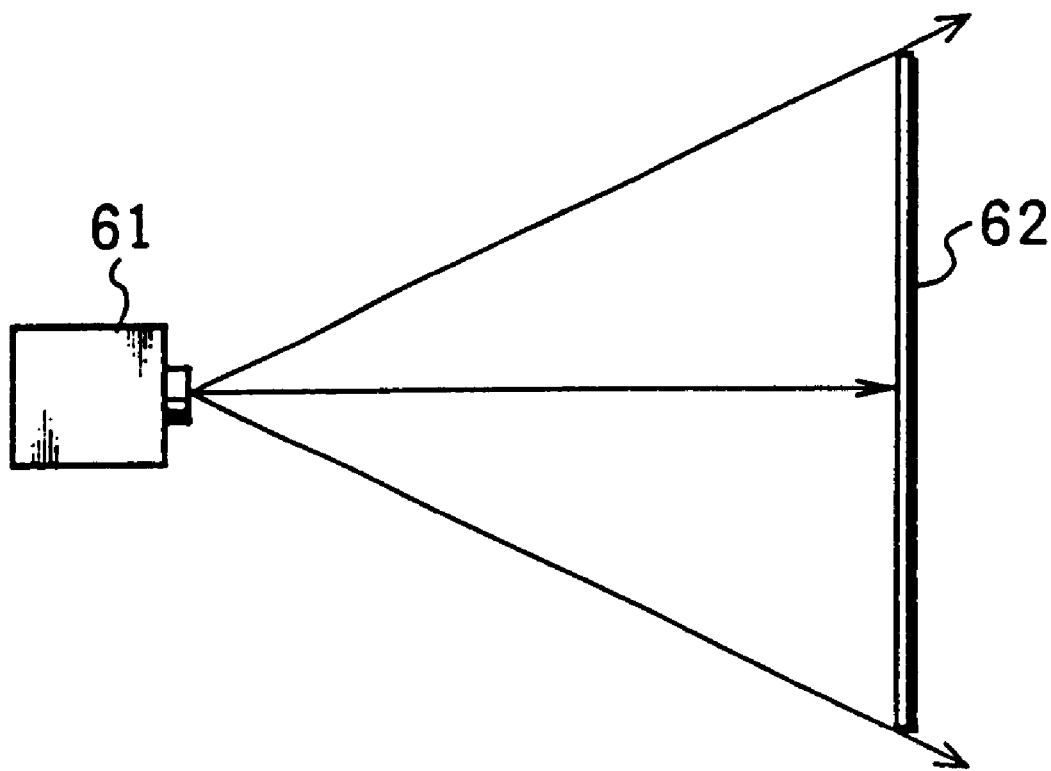
FIG. 1 is a plan view of a conventional image display apparatus and a flat screen.
Figure 2:
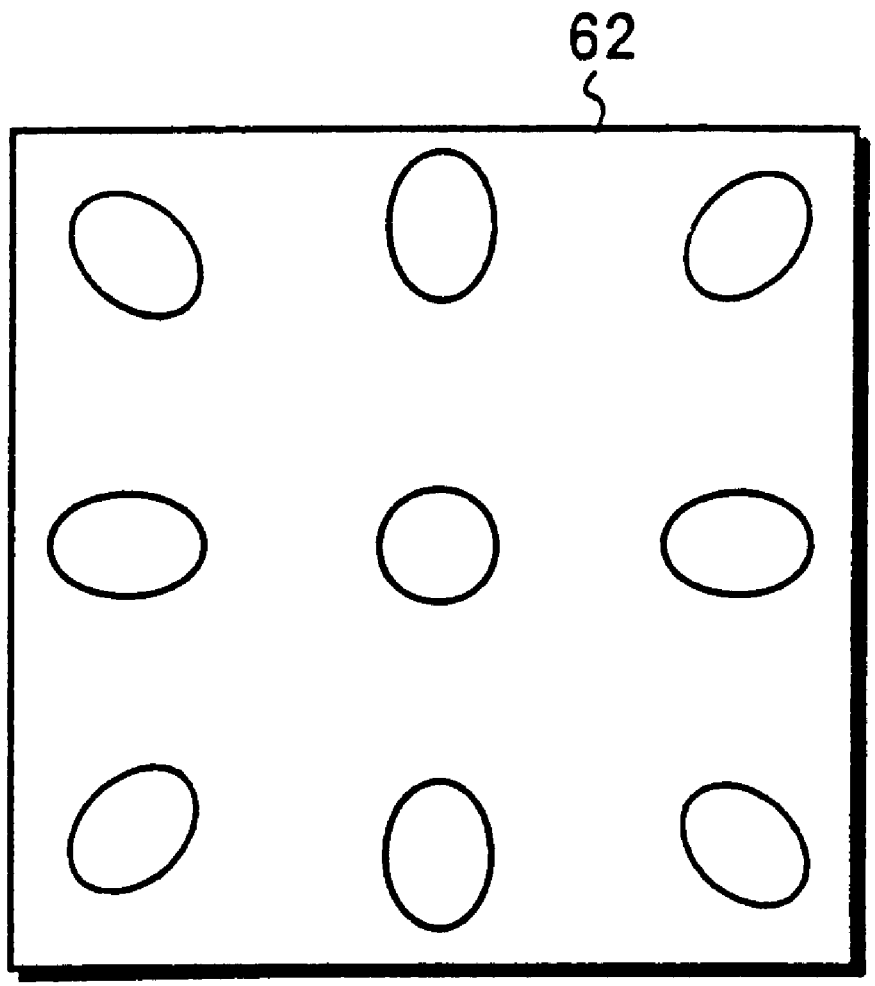
FIG. 2 is a view of a distorted image projected from the conventional image display apparatus onto the flat screen shown in FIG. 1.
Figure 3A:
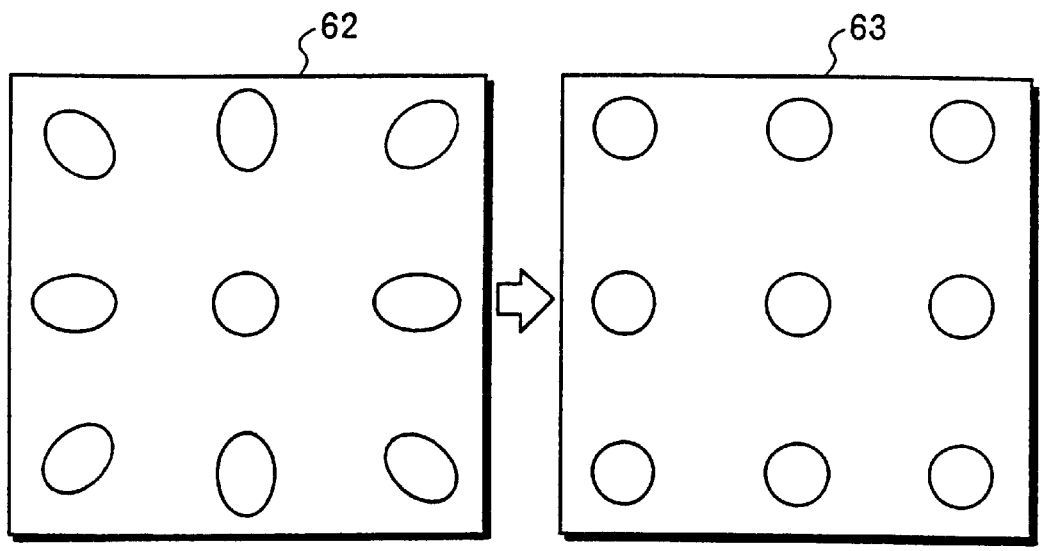
FIG. 3A is a view showing a manner in which the image data of a projected image is processed by a known data conversion process.
Figure 3B:
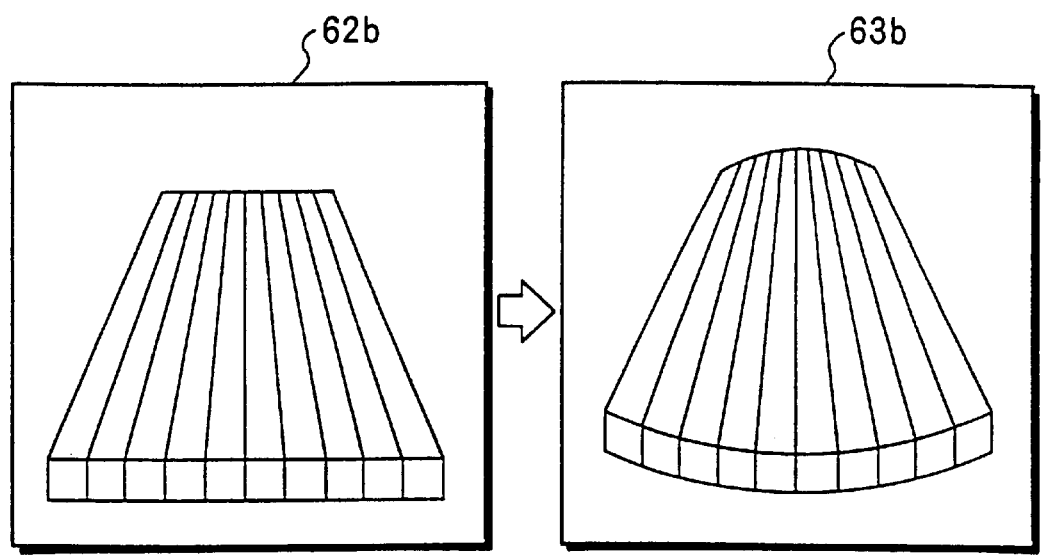
FIG. 3B is a view showing a manner in which the image data of another projected image is processed by the known data conversion process.
Figure 4:
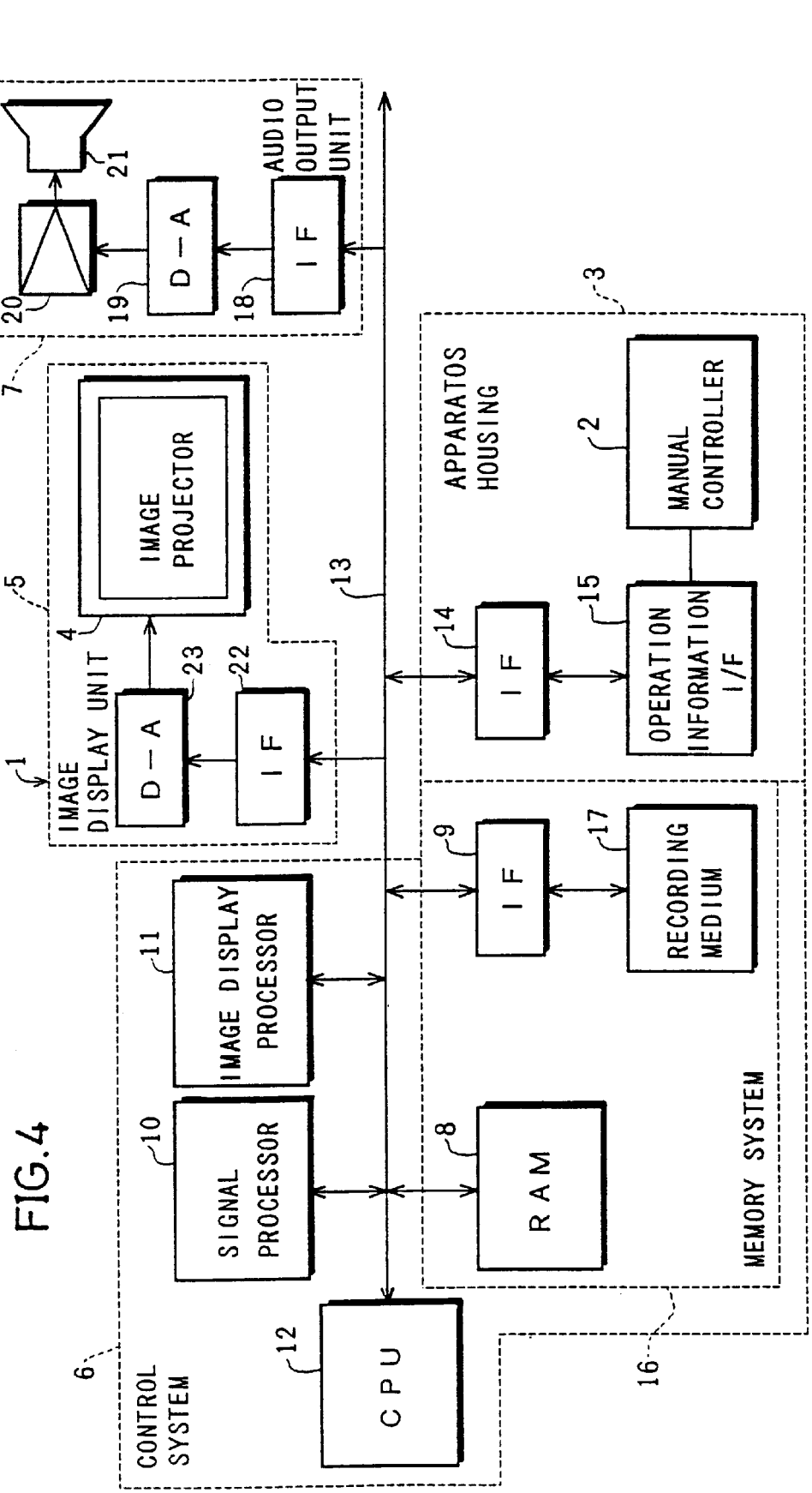
FIG. 4 is a block diagram of a racing game apparatus according to the present invention.

As shown in FIG. 4, a racing game apparatus 1, which incorporates the image display apparatus according to the present invention generally, comprises an apparatus housing 3 housing a manual controller 2 manually operable by a game player P (see FIG. 6), also referred to as a racing car driver, seated on a driver's seat 27 (see FIG. 6), an image display unit 5 disposed in front of the apparatus housing 3 and having an image projector 4 for projecting a front image, as viewed from the racing car driver, onto a concavely curved projection screen 29 (see FIG. 5) which extends around a front side of the racing car driver, a control system 6 for executing instructions based on signals entered from the manual controller 2 to generate and supply front image data to the image projector 4, and an audio output unit 7 controlled by the control system 6 for outputting sounds depending on details of images projected from the image projector 4.

The control system 6 comprises a random-access memory (RAM) 8 for temporarily storing various data, an interface (IF) 9, a signal processor 10, an image display processor 11, and a central processing unit (CPU) 12 for controlling the RAM 8, the interface 9, the signal processor 10, and the image display processor 11. The CPU 12, the RAM 8, the interface 9, the signal processor 10, and the image display processor 11 are interconnected by a bus 13 which comprises an address bus, a data bus, and a control bus. The manual controller 2 is connected through an interface 14 and an operation information interface 15 to the bus 13. Therefore, signals from the manual controller 2 are delivered through the interfaces 15, 14 and the bus 13 to the CPU 12, which executes instructions based on the signals from the manual controller 2.

A computer-readable recording medium 17 is connected to the interface 9. The RAM 8, the interface 9, and the computer-readable recording medium 17 jointly make up a memory system 16. The computer-readable recording medium 17 comprises a read-only memory (ROM) which stores racing game data including image data for generating virtual three-dimensional spatial images, sound data associated with the image data, and control program data including an operating system. Since a racing game is played on the racing game apparatus, the image data for generating virtual three-dimensional spatial images include image data of road tracks and image data of oncoming cars.

The signal processor 10 serves to calculate the positions of oncoming cars in two-dimensional coordinates in the virtual three-dimensional graphic environment, generate audio data, process image data of the calculated positions for perspective projection, and horizontally correct the image data for an image to be projected onto the curved projection screen at positions on opposite sides of a central region of the curved projection screen for perspective projection.

The image display processor 11 serves to write image data to be displayed into the RAM 8 based on the results of the image data processing carried out by the signal processor 10.

The CPU 12 controls the signal processor 10 to perform the perspective projection processing including the horizontal image correction, and also controls the image display processor 11 to write image data to be displayed and audio data to be reproduced into the RAM 8 based on the results of the perspective projection processing.

The audio output unit 7 comprises an interface 18 connected to the bus 13, a digital-to-analog (D/A) converter 19 for converting a digital audio signal from the interface 18 to an analog audio signal, an integrated amplifier 20 for amplifying an analog audio signal from the D/A converter 19, and a speaker 21 for radiating sounds based on an amplified analog audio signal from the integrated amplifier 20. Digital audio data written into the RAM 8 by the image display processor 11 is supplied through the bus 13 and the interface 18 to the D/A converter 19, which supplies an analog audio signal through the integrated amplifier 20 to the speaker 21. The speaker 21 then radiates sounds depending on how the racing game proceeds.

The image display unit 5 comprises an interface 22 connected to the bus 13 and a D/A converter 23 for converting a digital image signal from the interface 22 to an analog image signal. The image projector 4 projects an image based on an analog image signal from the D/A converter 23, and emits light of the image toward the curved projection screen 29. Digital image data written into the RAM 8 by the image display processor 11 is supplied through the bus 13 and the interface 22 to the D/A converter 23, which supplies an analog image signal to the image projector 4. Based on the supplied analog image signal, the image projector 4 projects a front image including a road track and competing cars and oncoming cars, as viewed from the racing car driver P seated on the driver's seat 27, onto the curved projection screen 29 at an enlarged scale.

The image display unit 5 and the control system 6, which corrects image data to eliminate image distortions including image elongations and image expansions for projecting inversely distorted images, jointly make up an image display apparatus according to the present invention.

Figure 5:
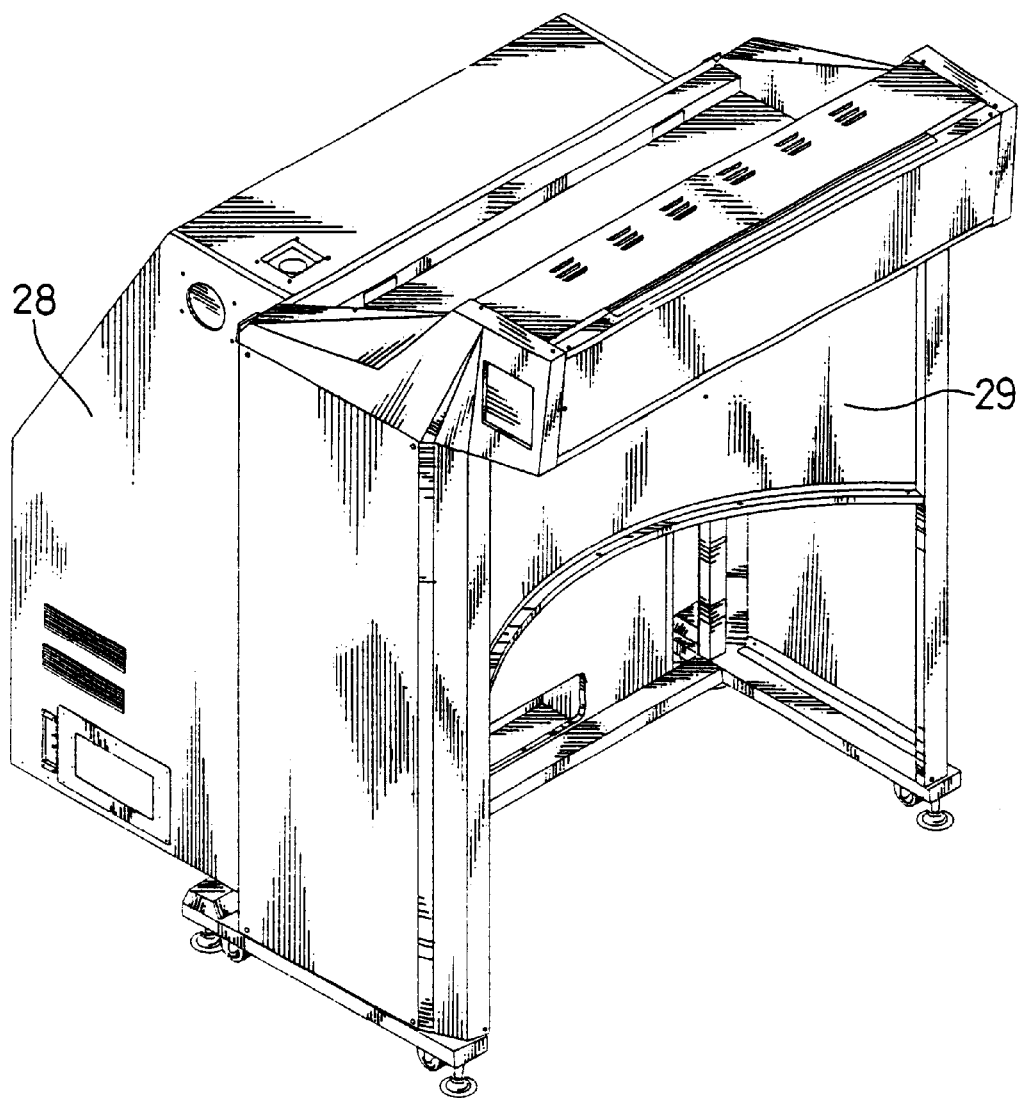
FIG. 5 is a perspective view of a display screen assembly of the racing game apparatus shown in FIG. 4.
Figure 6:
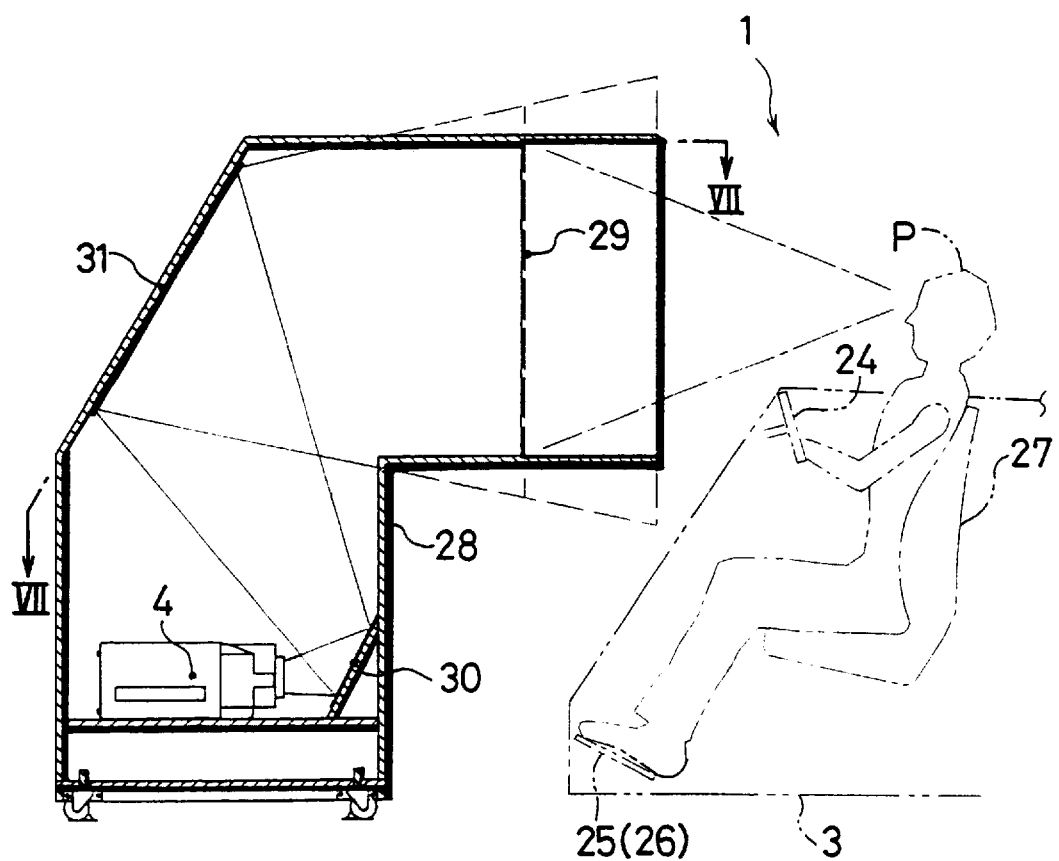
FIG. 6 is a vertical cross-sectional view of the display screen assembly shown in FIG. 5.
Figure 7:
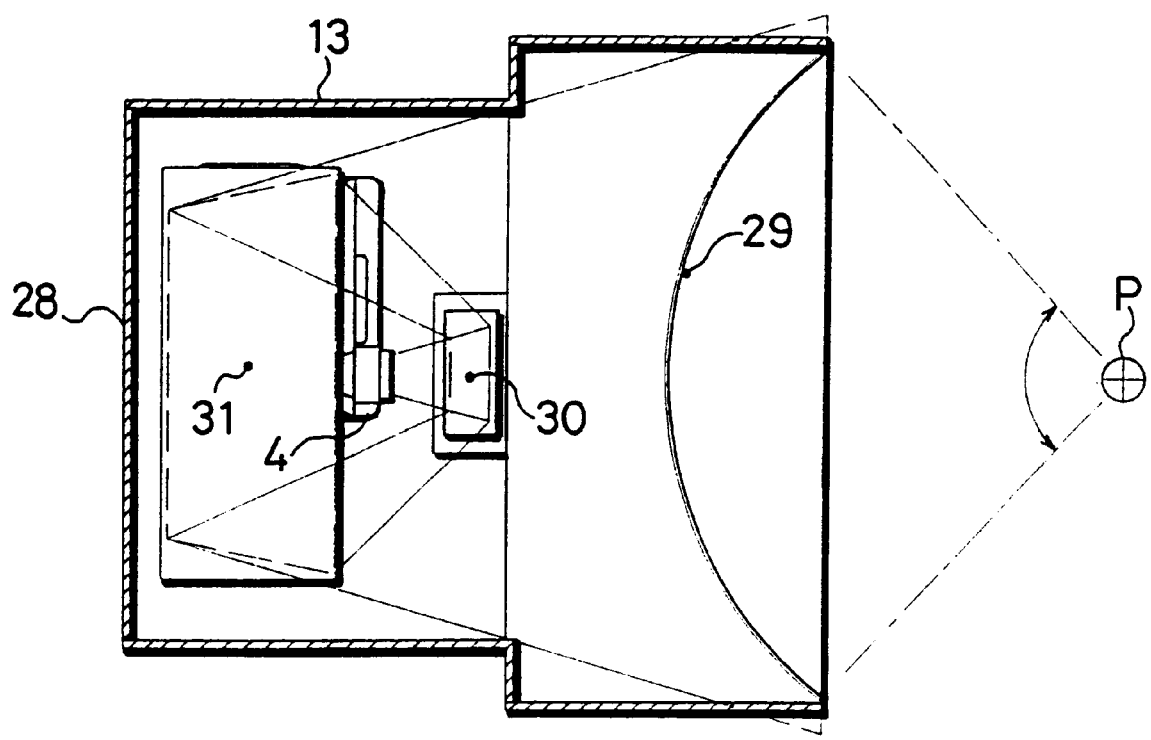
FIG. 7 is a horizontal cross-sectional view taken along line VII—VII of FIG. 6.

FIGS. 5 through 7 show a display screen assembly of the racing game apparatus 1.

As shown in FIG. 6, the manual controller 2 disposed in the apparatus housing 3 comprises a steering wheel 24, an accelerator pedal 25, and a brake pedal 26. The apparatus housing 3 also accommodates the driver's seat 27 for the racing car driver P to be seated. As shown in FIGS. 5 through 7, the display screen assembly has an outer housing 28 positioned in front of the apparatus housing 2 and housing the image display unit 5, the control system 6, and the audio output unit 7. The outer housing 28 also houses the curved projection screen 29 extending around the region in front of the racing car driver seated on the driver's seat 27. The outer housing 28 is of a bottomed hollow structure having an inverted L shape with a front opening closed by the curved projection screen 29.

As shown in FIGS. 6 and 7, the image projector 4 is mounted on a bottom plate in the outer housing 28 and has a projection lens (not shown) for emitting the light of a front image, as viewed from the racing car driver, onto the curved projection screen 29. The outer housing 28 accommodates therein a reflecting mirror 30 positioned in front of the projection lens and inclined upwardly for reflecting the image light from the image projector 4 obliquely upwardly and a reflecting mirror 31 positioned in facing relationship to the reflecting mirror 30 for reflecting the image light from the reflecting mirror 30 toward the curved projection screen 29. Therefore, the image light emitted from the image projector 4 is reflected successively by the reflecting mirrors 30, 31 toward a convex rear surface of the curved projection screen 29 at an enlarged scale.

When the racing car driver P turns the steering wheel 24 clockwise, the CPU 12 detects the clockwise turning movement of the steering wheel 24, controls the signal processor 10 to effect various signal processing depending on the angle through and the speed at which the steering wheel 24 is turned, based on the game data including image data and control program data stored in the recording medium 17, controls the image display processor 11 to write image data to be displayed into the RAM 8 based on the results of the various signal processing effected by the signal processor 10, and controls the image projector 4 to project an image onto the curved projection screen 29 based on the image data supplied from the RAM 8, so that the curved projection screen 29 will display the image of a right-hand area in front of the racing car to make the racing car look as if steered to the right. Conversely, when the racing car driver P turns the steering wheel 24 counterclockwise, the CPU 12 controls the signal processor 10 and the image display processor 11 to display on the curved projection screen 29 the image of a left-hand area in front of the racing car to make the racing car look as if steered to the left. When the racing car driver P presses the accelerator pedal 25, the CPU 12 controls the signal processor 10 and the image display processor 11 to display on the curved projection screen 29 an image as it moves backwards at an increased speed to make the racing car look as if it is accelerated. When the game player presses the brake pedal, the CPU 12 controls the signal processor 10 and the image display processor 11 to display on the curved projection screen 29 an image as it moves backwards at a reduced speed to make the racing car look as if it is decelerated.

Horizontal correction of image data for the shape and size of a front image projected onto and displayed on the curved projection screen 29 will be described below with reference to FIGS. 8 through 11.

Figure 8:
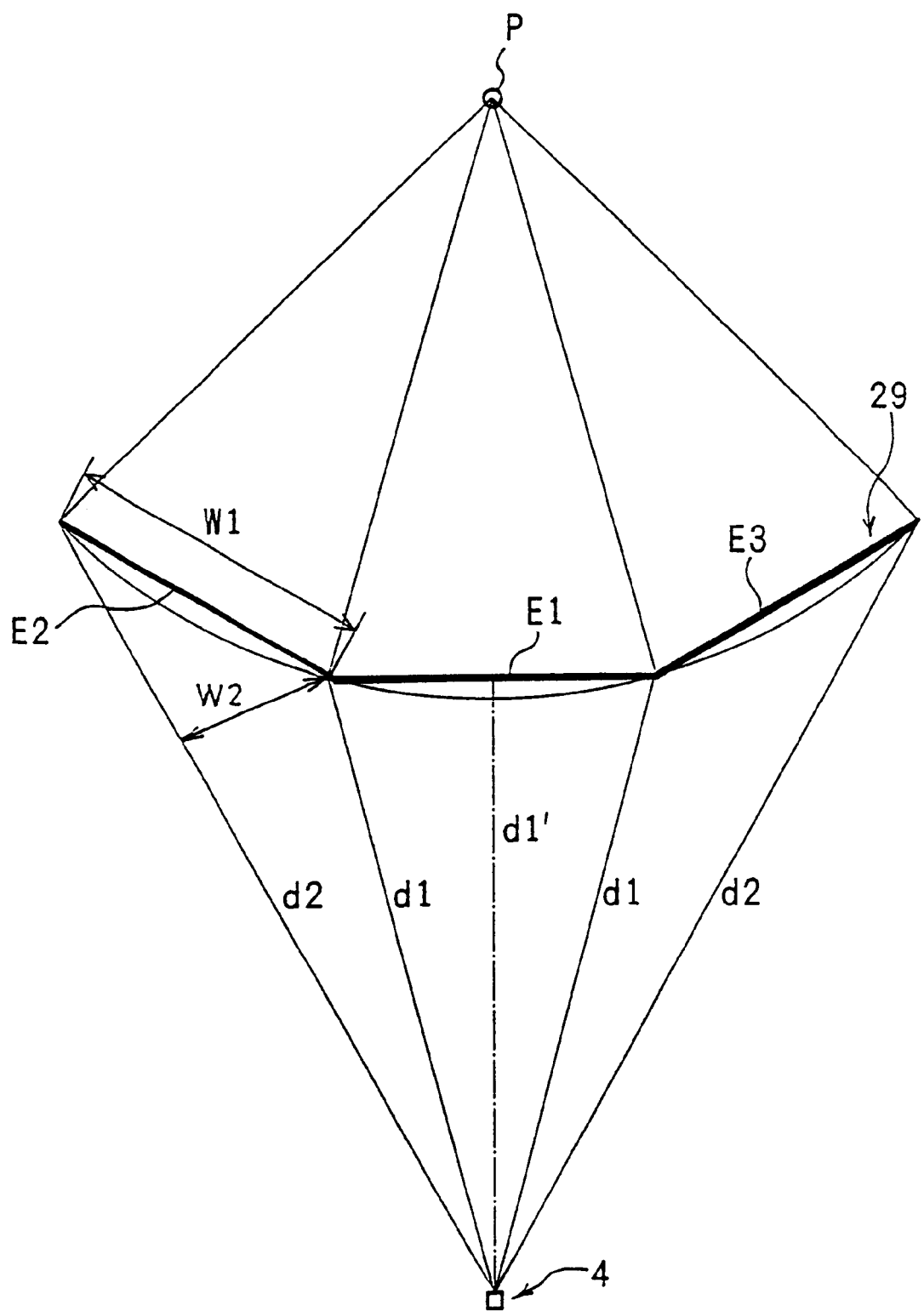
FIG. 8 is a schematic diagram showing the manner in which an image is projected onto a curved projection screen of the display screen assembly shown in FIG. 5.
Figure 9:
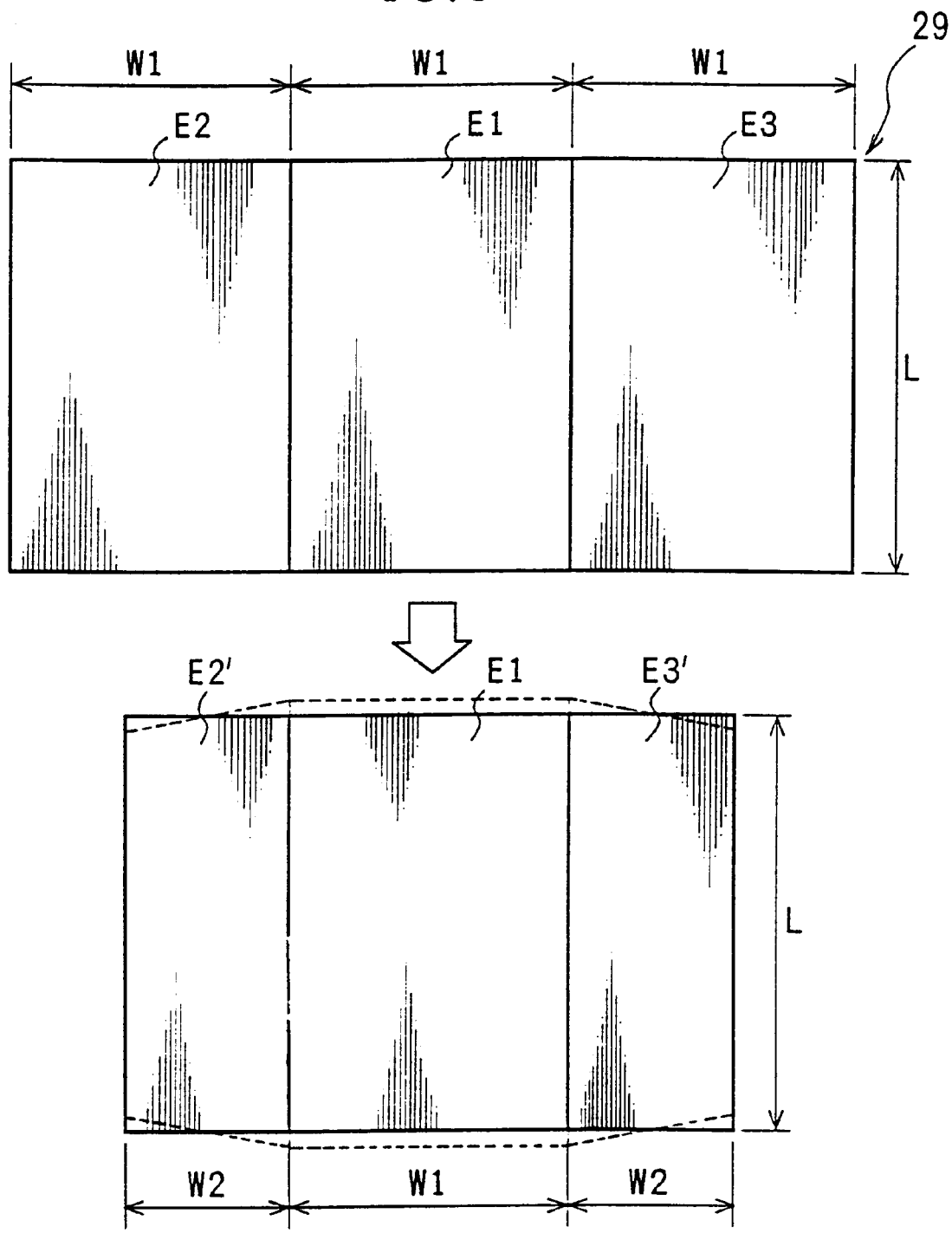
FIG. 9 is a diagram showing three screen areas of the curved projection screen shown in FIG. 8 and those three screen areas as viewed from an image projector.

The curved projection screen 29 is horizontally divided into a plurality of flat screen areas. For example, as shown in FIGS. 8 and 9, the curved projection screen 29 is horizontally divided into three flat screen areas E1, E2, E3 each having a width W1 and a height L. The image light emitted from the image projector 4, which is positioned behind the curved projection screen 29, is projected onto the convex rear surface of the curved projection screen 29, displaying a corresponding image which is viewed by the racing car driver P as if through a front windshield. As shown in FIG. 8, the screen areas E1, E2, E3 of the curved projection screen 29 are spaced at equal distances from the racing car driver P, so that the curved projection screen 29 extends as a horizontally panoramic screen around the curved projection screen 29. The racing car driver P can therefore see the displayed image realistically in a wide area in front of the racing car driver P.

In FIGS. 8 and 9, each of the screen areas E1, E2, E3 of the curved projection screen 29 extends flatwise horizontally. However, each of the screen areas E1, E2, E3 of the curved projection screen 29 may be curved horizontally.

The image projector 4 projects image light at respective angles onto the respective screen areas E1, E2, E3 so that respective images will be displayed on the screen areas E1, E2, E3. Specifically, an image which has not been subjected to any special image processing is projected onto the central screen area E1 at the same width as the width W1 of the central side screen area E1. The screen areas E2, E3 disposed one on each side of the central screen area E1 are viewed as screen areas E2', E3', respectively, from a viewing direction of the image projector 4, each of the screen areas E2', E3' having a width W2 (smaller than the width W1), which is a perceived width, and a height L. The screen areas E2, E3 are inclined to the central screen area E1 such that the screen areas E2, E3 are progressively further away from the image projector 4 in directions extending away from the central screen area E1. Therefore, images which have not been subjected to any special image processing are elongated horizontally when projected from the image projector 4 onto the respective screen areas E2, E3. To project unelongated images onto the screen areas E2, E3, the image data of images to be projected onto the screen areas E2, E3 are multiplied by the reciprocal of a horizontal elongation ratio which is the ratio of the width W1 to the width W2 (W1/W2), thus generating corrected image data with an adjusted aspect ratio and an adjusted angle of view for the screen areas E2', E3'. Then, image light based on the corrected image data is emitted from the image projector 4 and projected onto the screen areas E2, E3. When the image light is actually projected onto the screen areas E2, E3, images represented by the image light for the screen areas E2', E3' are horizontally elongated on the screen areas E2, E3. Since the image data has been multiplied by the reciprocal of the horizontal elongation ratio W1/W2, the images displayed on the screen areas E2, E3 based on the corrected image data are free of horizontal image elongations and look natural.

Furthermore, as shown in FIG. 8, inner edges of the screen areas E2, E3 are spaced from the image projector 4 by a smallest distance d1, and outer edges of the screen areas E2, E3 are spaced from the image projector 4 by a largest distance d2. The distance d1 remains substantially constant across the width W1 of the central screen area E1. Therefore, images projected onto the respective screen areas E2, E3 based on the image data are expanded at a rate that is greater as the difference between the distances d1, d2 is greater. Because the screen areas E2, E3 are inclined to the central screen area E1, the rate of expansion of the images increases as the distance from the image projector 4 increases from the distance d1 to the distance d2. To project unexpanded images onto the screen areas E2, E3, the image data of images to be projected onto the screen areas E2, E3 are multiplied by an image reduction ratio depending on the distance from the image projector 4, thus generating image data for the screen areas E2', E3'. Then, image light based on the corrected image data is emitted from the image projector 4 and projected onto the screen areas E2, E3. The image reduction ratio is progressively greater toward the outer edges of the screen areas E2, E3 because the images projected onto the screen areas E2, E3 are more expanded as the distance from the image projector 4 increases. Since the image data has been reduced at the image reduction ratio that is greater toward the outer edges of the screen areas E2, E3, the images displayed on the screen areas E2, E3 based on the corrected image data are expanded to their normal size, and hence look natural on the screen areas E2, E3.

The central screen area E1 is spaced from the image projector 4 by the distance d1 at its outer edges and by a smallest distance d1' at its central region. While the difference between these distances d1, d1' is not significantly large, it is responsible for some image distortions including image elongations and image expansions. Such image distortions will be smaller if the difference between these distances d1, d1' is smaller, i.e., if the width W1 of the central screen area E1 is smaller. One way of reducing the width W1 of the central screen area E1 is to divide the curved projection screen into a greater number of screen areas.

Figure 10:
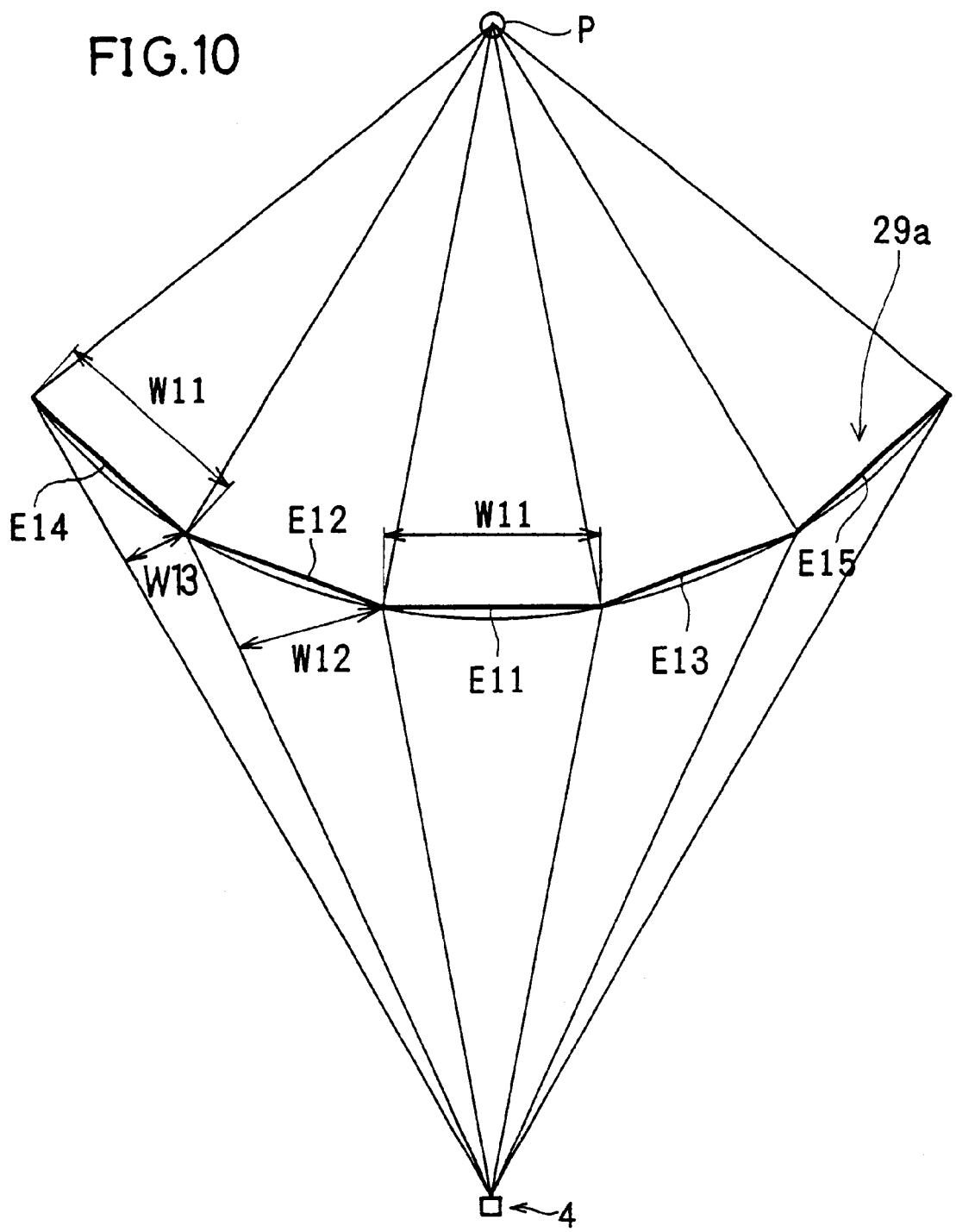
FIG. 10 is a schematic diagram showing the manner in which an image is projected onto a curved projection screen having five screen areas.
Figure 11:
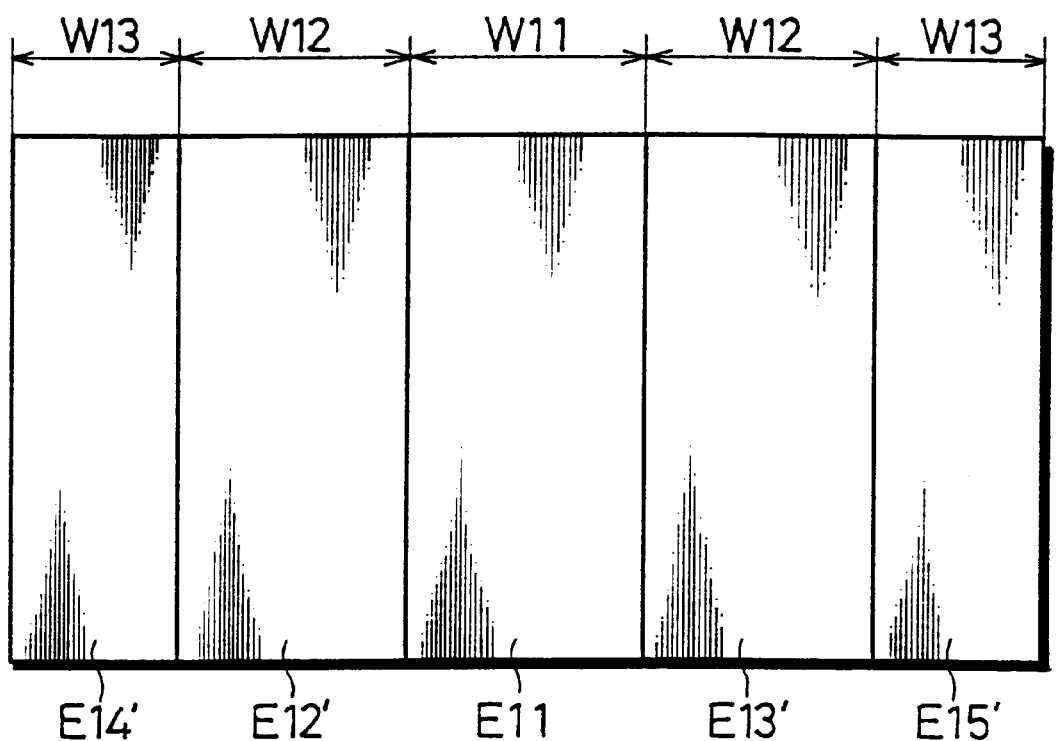
FIG. 11 is a diagram showing the five screen areas of the curved projection screen illustrated in FIG. 10 as viewed from an image projector.

FIGS. 10 and 11 show a curved projection screen 29a which is horizontally divided into five screen areas E11–E15. As shown in FIG. 10, each of the five screen areas E11–E15 physically has a width W11. The screen areas E12, E14 and E13, E15 disposed on opposite sides of the central screen area W11 are viewed as screen areas E12', E14' and E13', E15', respectively, from the image projector 4. The screen areas E12', E14' have respective widths W12, W13 (smaller than the width W11 and the widths W1, W2), and the screen areas E13', E15' have respective widths W12, W13 (smaller than the width W11 and the widths W1, W2). Since these screen areas E11–E15 are narrower than the screen areas E1–E3 shown in FIGS. 8 and 9, projected images displayed on the screen areas E11–E15 suffer less image distortions than the images displayed on the screen areas E1–E3. In addition, if the widths W11–W13 are suitably selected, the curved projection screen 29a may be horizontally longer than the curved projection screen 29, providing a horizontally longer panoramic view, which is wider and more realistic, in front of the racing car driver.

The image data of images to be displayed on the respective screen areas E1–E3 shown in FIGS. 8 and 9 may be generated as if by respective hypothetical cameras which have different directions of view associated respectively with the screen areas E1–E3. Specifically, these hypothetical cameras may have respective directions of view extending perpendicularly to the respective screen areas E1–E3. Each of the screen areas E1–E3 as viewed from the racing car driver P subtends an angle of 30° at the racing car driver P. Since the images produced by such hypothetical cameras and displayed on the respective screen areas E1–E3 are visually perceived as images which are seen by eyes directly facing them simply when the racing car driver P turns his head or eyes toward the screen areas E1–E3 through 30°, the displayed images look more realistic and three-dimensional.

Based on the control program data stored in the computer-readable recording medium 17, the CPU 12 controls the signal processor 10 to process virtual three-dimensional image data for perspective projection and horizontally correct the image data for images to be projected onto the curved projection screen 29, controls the image display processor 11 to write the image data into the RAM 8, and controls the image projector 4 to project images onto the curved projection screen 29 based on the image data read from the RAM 8. Since the image data are horizontally corrected, the images displayed on the curved projection screen 29 are prevented from being horizontally elongated and expanded in the horizontally opposite end regions of the curved projection screen 29. Furthermore, because the curved projection screen 29 gives the racing car driver a horizontally long panoramic view in front of the racing car driver, the images displayed on the curved projection screen 29 look wide and realistic.

In the illustrated embodiments, the curved projection screen is horizontally divided into three or five flat screen areas. However, the curved projection screen may be horizontally divided into more than five screen areas which may be either flat or continuously curved. As the number of screen areas increases, the images displayed on these screen areas are more smoothly blended with less noticeable joining lines therebetween. If the number of screen areas is relatively small, then it is necessary to process the image data of images to be projected onto the screen areas in order to make joining lines therebetween less noticeable.

In the embodiment shown in FIGS. 8 and 9, images based on image data processed for perspective projection and horizontal image correction are projected onto the screen areas E, E2', E3'. If image data is processed for perspective projection and both vertical and horizontal image correction, resultant images are projected onto screen areas as indicated by the dotted lines in FIG. 9.

The image display apparatus according to the present invention has been described above in combination with the racing game apparatus. However, the image display apparatus according to the present invention may be used in other game machines or driving simulation apparatus as arcade game machines. If the image display apparatus is used a home game machine or a personal computer, then control program data and image data may be stored in a computer-readable recording medium such a floppy disk, a CD-ROM, a magnetooptical disk, a DVD-ROM, or the like, and read by a reader in the home game machine or the personal computer into a memory therein.

Although certain preferred embodiments of the present invention have been shown and described in detail, it should be understood that various changes and modifications may be made therein without departing from the scope of the appended claims.

What is claimed is:

1. An image display apparatus comprising:

a concave projection screen extending about an axis and including a central screen area and side screen areas defined at opposing lateral sides of said central screen area, said concave projection screen being viewable from a concave side thereof;

image projecting means for projecting images based on image data for display onto a rear convex surface of said concave projection screen, said image projecting means projecting from a projector position substantially centrally aligned with said central screen area; and control means for horizontally correcting image position data from a three dimensional environment for images projected onto respective ones of said side screen areas of said concave projection screen by multiplying said image position data by an inverse of a horizontal distortion ratio for each of said side screen areas to precompress horizontally said image position data, and producing said image data for display therefrom, whereby horizontal distortion of the images projected on said side screen areas is at least partially corrected for.

2. The image display apparatus according to claim 1, wherein each of said side screen areas has a first width, said horizontal distortion ratio comprising a horizontal elongation ratio of said first width to a perceived width of each of said side screen areas as viewed from said image projecting means.

3. The image display apparatus according to claim 1, wherein said side screen areas define substantially flat screen areas that are inclined with respect to said central screen area such that said side screen areas are progressively further away from said image projecting means as said side screen areas are laterally further away from said central screen area.

4. An image display apparatus according to claim 1, wherein said concave projection screen is divided into a plurality of flat screen areas including said side screen areas and said central screen area, said concave projection screen extends around a front side of an observer position, and said image position data is generated as if to be projected by respective hypothetical cameras having respective directions of view extending perpendicularly to said flat screen areas, respectively.

5. The image display apparatus according to claim 1, wherein:

each of said side screen areas has a first width defined by a distance from a first lateral edge to a second lateral edge thereof;

each of said side screen areas has a perceived width as viewed from a viewing direction of said image projecting means which is a distance subtending a view angle defined by sightlines from said projector position to said first and second lateral edges and extending from one of said first and second lateral edges which is closest to said projector position in a direction orthogonal to said viewing direction; and said horizontal distortion ratio for each of said side screen areas is a horizontal elongation ratio of said first width to said perceived width of each of said side screen areas.

6. A method of projecting images from an image projecting means onto a rear convex surface of a concave projection screen extending about an axis, said concave projection screen being viewable from a concave side thereof, the method comprising the steps of:

defining areas of said concave projection screen including a central screen area and side screen areas defined at opposing lateral sides of said central screen area, wherein said image projecting means projects from a projector position substantially centrally aligned with said central screen area; and horizontally correcting image position data from a three dimensional environment for images projected onto respective ones of said side screen areas of said concave projection screen by multiplying said image position data by an inverse of a horizontal distortion ratio for each of said side screen areas to precompress horizontally said image position data, and producing said image data for display therefrom, whereby horizontal distortion of the images projected on said side screen areas is at least partially corrected for.

7. The method according to claim 6, wherein each of said side screen areas has a first width, said horizontal distortion ratio comprising a horizontal elongation ratio of said first width to a perceived width of each of said side screen areas as viewed from said image projecting means.

8. The method according to claim 6, wherein said side screen areas define substantially flat screen areas that are inclined with respect to said central screen area such that said side screen areas are progressively further away from said image projecting means as said side screen areas are laterally further away from said central screen area.

9. The method according to claim 6, wherein said concave projection screen is divided into a plurality of flat screen areas including said side screen areas and said central screen area, said concave projection screen extends around a front side of an observer position, and said image position data is generated as if to be projected by respective hypothetical cameras having respective directions of view extending perpendicularly to said flat screen areas, respectively.

10. The method according to claim 6, wherein:

each of said side screen areas has a first width defined by a distance from a first lateral edge to a second lateral edge thereof;

each of said side screen areas has a perceived width as viewed from a viewing direction of said image projecting means which is a distance subtending a view angle defined by sightlines from said projector position to said first and second lateral edges and extending from one of said first and second lateral edges which is closest to said projector position in a direction orthogonal to said viewing direction; and said horizontal distortion ratio for each of said side screen areas is a horizontal elongation ratio of said first width to said perceived width of each of said side screen areas.

11. A computer-readable recording medium storing an executable control program for projecting images from an image projecting means onto a rear convex surface of a concave projection screen extending about an axis, said concave projection screen being viewable from a concave side thereof, said control program comprising the steps of:

defining areas of said concave projection screen including a central screen area and side screen areas defined at opposing lateral sides of said central screen area, wherein said image projecting means projects from a projector position substantially centrally aligned with said central screen area; and horizontally correcting image position data from a three dimensional environment for images projected onto respective ones of said side screen areas of said concave projection screen by multiplying said image position data by an inverse of a horizontal distortion ratio for each of said side screen areas to precompress horizontally said image position data, and producing said image data for display therefrom, whereby horizontal distortion of the images projected on said side screen areas is at least partially corrected for.

12. The computer-readable recording medium according to claim 11, wherein each of said side screen areas has a first width, said horizontal distortion ratio comprising a horizontal elongation ratio of said first width to a perceived width of each of said side screen areas as viewed from said image projecting means.

13. The computer-readable recording medium according to claim 11, wherein said side screen areas define substantially flat screen areas that are inclined with respect to said central screen area such that said side screen areas are progressively further away from said image projecting means as said side screen areas are laterally further away from said central screen area.

14. The computer-readable recording medium according to claim 11, wherein said concave projection screen is divided into a plurality of flat screen areas including said side screen areas and said central screen area, said concave projection screen extends around a front side of an observer position, and said image position data is generated as if to be projected by respective hypothetical cameras having respective directions of view extending perpendicularly to said flat screen areas, respectively.

15. The computer-readable recording medium according to claim 11, wherein:

each of said side screen areas has a first width defined by a distance from a first lateral edge to a second lateral edge thereof;

each of said side screen areas has a perceived width as viewed from a viewing direction of said image projecting means which is a distance subtending a view angle defined by sightlines from said projector position to said first and second lateral edges and extending from one of said first and second lateral edges which is closest to said projector position in a direction orthogonal to said viewing direction; and said horizontal distortion ratio for each of said side screen areas is a horizontal elongation ratio of said first width to said perceived width of each of said side screen areas.

16. An image display apparatus comprising:

a projection screen including a central screen area and side screen areas defined at opposing lateral sides of said central screen area, said side screen areas being successively inclined toward an observer position from which front surfaces of said central screen area and said side screen areas are viewed;

image projecting means for projecting images based on image data for display onto rear surfaces of said central screen area and said side screen areas, said image projecting means projecting from a projector position substantially centrally aligned with said central screen area;

each of said side screen areas having a first width defined by a distance from a first lateral edge to a second lateral edge thereof;

each of said side screen areas having a perceived width as viewed from a viewing direction of said image projecting means which is a distance subtending a view angle defined by sightings from said projector position to said first and second lateral edges and extending from one of said first and second lateral edges which is closest to said projector position in a direction orthogonal to said viewing direction;

each of said side screen areas having a horizontal distortion ratio defined therefor which is a horizontal elongation ratio of said first width to said perceived width of each of said side screen areas; and control means for horizontally correcting image position data from a three dimensional environment for images projected onto respective ones of said side screen areas of said projection screen by multiplying said image position data by an inverse of said horizontal distortion ratio for each of said side screen areas to precompress horizontally said image position data, and producing said image data for display therefrom, whereby horizontal distortion of the images projected on said side screen areas is at least partially corrected for.

17. The image display apparatus according to claim 16, wherein said side screen areas define substantially flat screen areas that are inclined with respect to said central screen area such that said side screen areas are progressively further away from said image projecting means as said side screen areas are laterally further away from said central screen area.

18. The image display apparatus according to claim 16, wherein said projection screen is divided into a plurality of flat screen areas including said side screen areas and said central screen area, said projection screen extends around a front side of said observer position, and said image data is generated as if to be projected by respective hypothetical cameras having respective directions of view extending perpendicularly to said flat screen areas, respectively.

19. A method of projecting images comprising the steps of:

providing a projection screen including a central screen area and side screen areas defined at opposing lateral sides of said central screen area, said side screen areas being successively inclined toward an observer position from which front surfaces of said central screen area and said side screen areas are viewed;

providing an image projecting means for projecting images based on image data for display onto rear surfaces of said central screen area and said side screen areas, said image projecting means projecting from a projector position substantially centrally aligned with said central screen area;

determining a first width, of each of said side screen areas, defined by a distance from a first lateral edge to a second lateral edge of each of said side screen areas;

determining a perceived width, of each of said side screen areas as viewed from a viewing direction of said image projecting means, each perceived width being a distance subtending a view angle defined by sightlines from said projector position to said first and second lateral edges and extending from one of said first and second lateral edges which is closest to said projector position in a direction orthogonal to said viewing direction for respective ones of said side screen areas;

determining a horizontal distortion ratio for each of said side screen areas which is a horizontal elongation ratio of said first width to said perceived width of each of said side screen areas; and horizontally correcting image position data from a three dimensional environment for images projected onto respective ones of said side screen areas of said projection screen by multiplying said image position data by an inverse of said horizontal distortion ratio for each of said side screen areas to precompress horizontally said image position data, and producing said image data for display therefrom, whereby horizontal distortion of the images projected on said side screen areas is at least partially corrected for.

20. The method according to claim 19, wherein said side screen areas define substantially flat screen areas that are inclined with respect to said central screen area such that said side screen areas are progressively further away from said image projecting means as said side screen areas are laterally further away from said central screen area.

21. The method according to claim 19, wherein said projection screen is divided into a plurality of flat screen areas including said side screen areas and said central screen area, said projection screen extends around a front side of said observer position, and said image data is generated as if to be projected by respective hypothetical cameras having respective directions of view extending perpendicularly to said flat screen areas, respectively.

* * * * *